US012633530B2

(12) United States Patent
Kim et al.

(10) Patent No.: US 12,633,530 B2
(45) Date of Patent: May 19, 2026

(54) POSITIVE ACTIVE MATERIAL FOR LITHIUM SECONDARY BATTERY, METHOD OF PREPARING SAME, AND LITHIUM SECONDARY BATTERY INCLUDING POSITIVE ELECTRODE INCLUDING THE POSITIVE ACTIVE MATERIAL

(71) Applicant: Samsung SDI Co., Ltd., Yongin-si (KR)

(72) Inventors: Youngki Kim, Yongin-si (KR); Yongmok Cho, Yongin-si (KR); Sungho Choo, Yongin-si (KR); Sangmi Kim, Yongin-si (KR); Minjae Choi, Yongin-si (KR); Jaeyoung Jeong, Yongin-si (KR); Hyunjei Chung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 697 days.

(21) Appl. No.: 17/981,301

(22) Filed: Nov. 4, 2022

(65) Prior Publication Data

US 2023/0147051 A1     May 11, 2023

(30) Foreign Application Priority Data

Nov. 5, 2021     (KR) ........................ 10-2021-0151678

(51) Int. Cl.
H01M 4/485         (2010.01)
H01M 4/02          (2006.01)
(Continued)

(52) U.S. Cl.
CPC ......... H01M 4/485 (2013.01); H01M 4/0471 (2013.01); H01M 4/366 (2013.01);
(Continued)

(58) Field of Classification Search
CPC .... H01M 4/485; H01M 4/0471; H01M 4/366; H01M 10/052
See application file for complete search history.

(56) References Cited

U.S. PATENT DOCUMENTS

2008/0268347 A1    10/2008    Ohzuku et al.
2016/0020456 A1    1/2016    Song et al.
(Continued)

FOREIGN PATENT DOCUMENTS

KR        2009-0080939 A        7/2009
KR        2013-0118196 A        10/2013
(Continued)

OTHER PUBLICATIONS

Wang et al. "High-Voltage LiCoO2 Material Encapsulated in a Li4Ti5O12 Ultrathin Layer by High-Speed Solid-Phase Coating Process", 3(3) ACS Applied Energy Materials, 2593-2603, Feb. 18, 2020, 11 pages (Year: 2020).*
(Continued)

*Primary Examiner* — Karie O'Neill Apicella
(74) *Attorney, Agent, or Firm* — Womble Bond Dickinson (US) LLP

(57)         ABSTRACT

Provided are a positive active material for a lithium secondary battery, a method of preparing the same, and a lithium secondary battery including a positive electrode for a lithium secondary battery including the positive active material, where the positive active material includes a lithium cobalt-based oxide including about 6,000 ppm or more of aluminum, and a lithium titanium-based compound, where the lithium titanium-based compound is on a surface of the lithium cobalt-based oxide.

19 Claims, 6 Drawing Sheets

(51) Int. Cl.

| | |
|---|---|
| *H01M 4/04* | (2006.01) |
| *H01M 4/36* | (2006.01) |
| *H01M 10/052* | (2010.01) |

(52) U.S. Cl.
CPC .... *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2017/0222211 A1* | 8/2017 | Ryu | H01M 4/502 |
| 2017/0346133 A1 | 11/2017 | Je et al. | |
| 2017/0358794 A1 | 12/2017 | Lee et al. | |
| 2018/0316007 A1 | 11/2018 | Jo et al. | |
| 2019/0214639 A1 | 7/2019 | Cho et al. | |
| 2020/0220173 A1* | 7/2020 | Jo | H01M 4/36 |
| 2020/0343537 A1 | 10/2020 | Jo et al. | |
| 2021/0083286 A1 | 3/2021 | Kuroda et al. | |

FOREIGN PATENT DOCUMENTS

| | | | |
|---|---|---|---|
| KR | 2017-0135160 A | 12/2017 | |
| KR | 2017-0140633 A | 12/2017 | |
| KR | 2017-0142428 A | 12/2017 | |
| KR | 2019-0032118 A | 3/2019 | |
| KR | 2019-0054977 A | 5/2019 | |
| KR | 2019-0085356 A | 7/2019 | |
| KR | 2020-0130819 A | 11/2020 | |

OTHER PUBLICATIONS

Office action issued on Jan. 15, 2025 by KIPO for corresponding Korean Patent Application No. 10-2021-0151678, 12 pages.

Wang, C., et al., *High-Voltage* $LiCoO_2$ *Material Encapsulated in a* $Li_4Ti_5O_{12}$ *Ultrathin Layer by High-Speed Solid-Phase Coating Process*, 3(3) ACS App. Energy Mater. 2593-2603, Feb. 18, 2020, 11 pages.

\* cited by examiner

| HV | mag | bias | ⊢———5 µm———⊣ |
|---|---|---|---|
| 3.00 kV | 20,000 x | 0 V | |

POSITIVE ACTIVE MATERIAL FOR LITHIUM SECONDARY BATTERY, METHOD OF PREPARING SAME, AND LITHIUM SECONDARY BATTERY INCLUDING POSITIVE ELECTRODE INCLUDING THE POSITIVE ACTIVE MATERIAL

CROSS-REFERENCE TO RELATED APPLICATION

This application claims priority to and the benefit of Korean Patent Application No. 10-2021-0151678, filed on Nov. 5, 2021, in the Korean Intellectual Property Office, the entire content of which is herein incorporated by reference.

BACKGROUND

1. Field

The present disclosure relates to a positive active material for a lithium secondary battery, a method of preparing the same, and a lithium secondary battery including a positive electrode including the positive active material.

2. Description of the Related Art

Recently, the use of portable electronic devices is increasing as the development of the advanced electronics industry has enabled the miniaturization and weight reduction of electronic equipment. Lithium secondary batteries, which have a high energy density and a long lifespan, are widely utilized as a power source for such portable electronic devices.

Lithium cobalt oxide ($LiCoO_2$) is widely used as a positive active material for lithium secondary batteries having high energy density. However, when lithium cobalt oxide is utilized as a positive active material, the positive active material is in contact with the electrolyte solution in the battery environment, and an interfacial structure may be destroyed due to corrosion by hydrogen fluoride (HF) especially at high voltages and high temperatures and thus, cobalt (Co) is eluted and the capacity of the battery is reduced. In order to prevent or reduce collapse of a layered positive active material structure in a high voltage environment, lithium cobalt oxide is doped with magnesium.

However, when magnesium is doped in such a way, battery capacity and efficiency may deteriorate, and when a Ti coating is applied, Mg moves to the surface by the Kirkendall effect, thereby reducing an internal doping effect.

SUMMARY

Aspects of one or more embodiments are directed towards a novel positive active material for a lithium secondary battery with improved high-voltage stability and a method of preparing the same.

Aspects of one or more embodiments are directed towards a lithium secondary battery having improved stability at high voltages and enhanced high-temperature characteristics by utilizing a positive electrode including the above-described positive active material for a lithium secondary battery.

Additional aspects will be set forth in part in the description which follows and, in part, will be apparent from the description, or may be learned by practice of the presented embodiments of the disclosure.

According to one or more embodiments of the present disclosure, a positive active material for a lithium secondary battery includes a lithium cobalt-based oxide containing 6,000 ppm or more of aluminum, and a lithium titanium-based compound, wherein The lithium titanium-based compound is on the surface of the lithium cobalt-based oxide.

According to one or more embodiments of the present disclosure, a lithium secondary battery includes: a positive electrode including the above-described positive active material; a negative electrode; and an electrolyte between the positive electrode and the negative electrode.

According to one or more embodiments of the present disclosure, a method of preparing the positive active material for a lithium secondary battery includes: obtaining a mixture by mixing the lithium cobalt-based oxide containing 6,000 ppm or more of aluminum, a cobalt precursor, a lithium precursor, and a titanium precursor; and heat-treating the mixture.

BRIEF DESCRIPTION OF THE DRAWINGS

The above and other aspects, features, and/or principles of certain embodiments of the present disclosure will be more apparent from the following description taken in conjunction with the accompanying drawings, in which.

DETAILED DESCRIPTION

Figure 1:
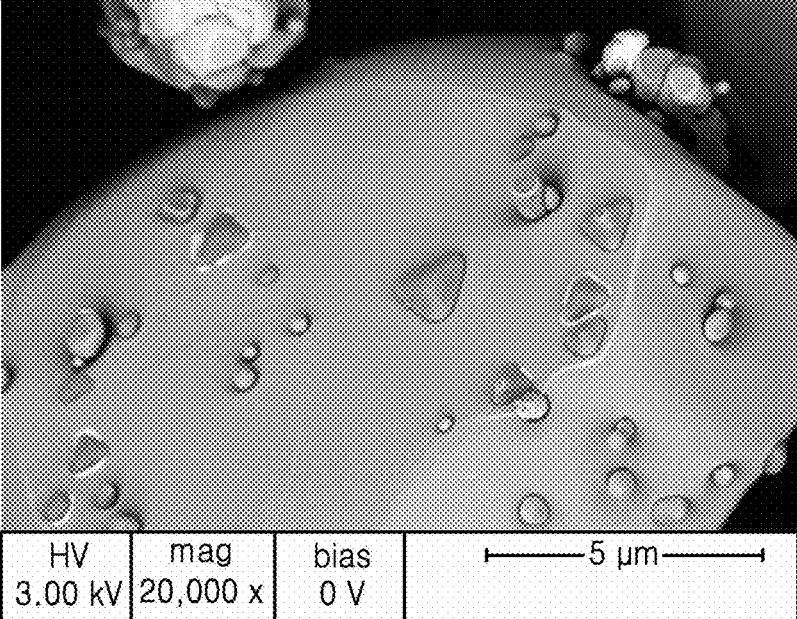
FIG. 1 is a scanning electron microscope image of a positive active material prepared according to Example 1.

The present disclosure may be modified in many alternate forms, and thus specific embodiments will be illustrated in the drawings and described in more detail. It should be understood, however, that it is not intended to limit the present disclosure to the particular forms disclosed, but rather, is intended to cover all modifications, equivalents, and alternatives falling within the spirit and scope of the present disclosure.

Reference will now be made in more detail to embodiments, which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. These embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

As used herein, the term "and/or" includes any and all combinations of at least one of the associated listed items. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

Hereinafter, a positive active material, a method of preparing the same, and a lithium secondary battery including a positive electrode including the positive active material according to example embodiments will be described in more detail.

A positive active material according to one or more embodiments is a lithium cobalt-based oxide containing 6,000 ppm or more of aluminum, wherein lithium titanium-based oxide is present on a surface of the lithium cobalt-based oxide.

As utilized herein, the ppm content (e.g., amount) of aluminum refers to the mass of aluminum with respect to a million of the mass of the entire positive active material.

The lithium titanium compound may be arranged on a surface of the lithium cobalt-based oxide in a form of islands (e.g., the lithium titanium-based compound is formed in separate island-like structures on the surface of the lithium cobalt-based oxide).

Lithium cobalt-based oxide ($LiCoO_2$) has a structure (O3-type or kind layered structure) in which lithium, cobalt, and oxygen are regularly arranged as O—Li—O—Co—O—Li—O—Co—O along the [111] crystal plane of a rock salt structure. When a lithium secondary battery utilizing such lithium cobalt-based oxide is charged, lithium ions are deintercalated out of the lattice in the crystal lattice of the lithium cobalt-based oxide. However, when a charging voltage increases, an amount of lithium ions deintercalating from the crystal lattice of the lithium cobalt-based oxide increases, and thus, at least a part of the O3-type or kind layered structure may undergo a phase transition to a O1-type or kind layered structure, in which Li does not exist in the crystal lattice. Accordingly, in a high voltage range of a charging voltage of 4.52 V or more (when fully charged), the lithium cobalt-based oxide may undergo a phase transition to a H1-3-type or kind layered structure, in which both (e.g., simultaneously) the O3-type or kind layered structure and the O1-type or kind layered structure are present in the crystal lattice of the lithium cobalt-based oxide. In this way, the phase transfer from the O3-type or kind layered structure to the H1-3-type or kind layered structure and the O1-type or kind layered structure is at least partially irreversible, and in the H1-3-type or kind layered structure and the O1-type or kind layered structure, lithium ions that may be intercalated/deintercalated are reduced. Therefore, when such a phase transition occurs, storage and lifespan characteristics of the lithium secondary battery are unavoidably rapidly deteriorated.

In order to solve the above-described problem, lithium cobalt-based oxide doped with magnesium was proposed as a positive active material that may prevent or substantially prevent collapse of the structure in a high-voltage environment. When magnesium is doped, even when lithium moves out excessively during discharging, magnesium takes up lithium sites, and a structurally stable state is maintained. In this case, however, capacity and charge/discharge efficiency of the lithium secondary battery are deteriorated, and an improvement is needed.

In order to improve the charge/discharge efficiency and surface resistance, a method of coating a titanium (Ti) compound has been proposed. In this case, Mg doped inside the lithium cobalt-based oxide moves to a surface of the lithium cobalt-based oxide by the Kirkendall effect and a Mg—Ti composite material is formed. However, in such a positive active material, an amount of doped magnesium (Mg) inside the lithium cobalt-based oxide is reduced, and lifespan characteristics of the positive active material may deteriorate.

In order to solve the above-described problem, one or more embodiments dope 6,000 ppm or more of aluminum (Al) into the lithium cobalt-based oxide, and a part of the doped aluminum substitutes lithium sites and a stable structure may be maintained without doping magnesium (Mg). Even when the positive active material is doped with magnesium, side reactions due to Ti and the Kirkendall effect may be minimized or reduced. Therefore, a positive active material stable in a high-voltage environment having an improved capacity and charge/discharge efficiency, may be provided. In one or more embodiments, due to a filler effect of aluminum that substitutes lithium sites, not only the particle strength and crush strength are improved but also a positive active material having an improved surface resistance and high-temperature characteristics without deterioration of lifespan characteristics may be manufactured.

The lithium cobalt-based oxide may be small particles, large particles, or a mixture thereof. A size (e.g., an average size) of the large particles may be 10 μm to 20 μm, and a size (e.g., an average size) of the small particles may be 2 μm to 8 μm. And, a mixing weight ratio of the large particles to the small particles is 7:3 to 9:1 in the mixture of large particles and small particles.

A mixing weight ratio of the large particles to the small particles is, for example, 8:2 to 9:1. When a mixing weight ratio of large particles to small particles is within the range, high-temperature storage characteristics are improved.

A size (e.g., an average size) of the large particles is 10 μm to 20 μm as described above, and is for example, 14 μm to 20 μm, or 15 μm to 20 μm. And, a size (e.g., an average size) of the small particles is 2 μm to 8 μm as described above, and is for example, 3 μm to 7 μm, or 3 μm to 5 μm.

In the present specification, a "size" of a particle is a particle diameter when the particles is spherical, and refers to a major axis length of a particle when the particle is non-spherical.

The particle diameter is, for example, an average particle diameter, and the major axis length is, for example, an average length of the long axis. The average particle diameter and the average major axis length indicates average values of the measured particle diameter and the measured major axis length, respectively.

A particle size may be evaluated by utilizing a particle size analyzer, a scanning electron microscope, or a transmission electron microscope. For the particle size analyzer, for example, a HORIBA, LA-950 laser particle size analyzer may be utilized.

The average particle diameter is, for example, an average particle diameter observed by utilizing a scanning electron microscope, and may be calculated as an average value of particle diameters of about 10 to 30 particles in an SEM image.

When a particle size analyzer is utilized to measure particle size, the average particle diameter refers to D50.

D50 refers to an average diameter (or size) of particles whose cumulative volume corresponds to 50 volume % in a particle diameter (or size) distribution (e.g., cumulative distribution), and in the cumulative distribution curve, particles are accumulated in the order of the smallest particle size to the largest particle size, and D50 refers to a particle diameter (or size) value of the particle size corresponding to 50% from the smallest particle when the total number of particles in 100% in the distribution curve. D50 may be measured by utilizing a particle size analyzer. In one or more embodiments, D50 data may be obtained by utilizing a measuring device which uses dynamic light-scattering, through which particle numbers may be counted for each particle size range in a data analysis, and a D50 value may be easily obtained by calculation.

The lithium titanium-based compound is a compound represented by Formula 1:

$$Li_{4-x}Mg_xTi_5M1_yO_{12},$$   Formula 1 wherein in Formula 1, $0 \leq x \leq 0.1$, and $0 \leq y \leq 0.1$, and
M1 includes (e.g., is at least one element selected from) Co, Al, B, Ca, Sr, Ba, V, Cr, Fe, Cu, W, Mo, Zr, Ta, and/or Nb.

The lithium titanium-based compound belongs to a space group of Fd-3m, and has a spinel structure. When the lithium cobalt-based oxide is not doped with magnesium in order to prevent or reduce the Kirkendall effect, it may be x=0.

The lithium titanium-based compound may have a structure in which particles having a size of 0.2 μm to 2 μm are coated in a form of islands (e.g., the lithium titanium-based compound is formed in separate island-like structures on the surface of the lithium cobalt-based oxide). When the lithium titanium-based compound has this structure, a positive active material having an improved surface resistance characteristics may be obtained.

In a positive active material according to one or more embodiments, a content (e.g., amount) of aluminum may be 6,000 ppm (2.0 mol %) to 9,000 ppm (3.3 mol %), 6,000 ppm to 8,000 ppm (2.9 mol %), or 6,000 ppm to 7,000 ppm (2.5 mol %). The content (e.g., amount) of aluminum may be 2.0 mol % to 3.3 mol % with respect to the total metal content (e.g., amount) of the positive active material. When the content (e.g., amount) of aluminum is in these ranges, a positive active material having improved high-voltage characteristics may be obtained. Here, "high voltage" refers to a voltage in a range of 4.3 V to 4.8 V.

A positive active material is a compound represented by Formula 2:

$$Li_{a-b}Al_bCo_{1-x-y-z}Al_xTi_yM2_zO_2,$$   Formula 2 wherein in Formula 2, $0.9 \leq a \leq 1.1$, $0 \leq b \leq 0.1$, $0.02 \leq x \leq 1$, $0 < y \leq 0.01$, and $0 \leq z < 0.01$, and
M2 includes (e.g., is at least one element selected from) Al, B, Ca, Sr, Ba, V, Cr, Fe, Cu, W, Mo, Zr, Ta, and/or Nb.
In Formula 2, x may be, for example, $0.02 \leq x \leq 0.04$, $0.02 \leq x \leq 0.03$, or $0.02 \leq x \leq 0.025$, y may be, for example, $0.001 \leq y \leq 0.005$, $0.001 \leq y \leq 0.003$, or $0.001 \leq y \leq 0.002$.

When lithium sites of a positive active material according to one or more embodiments are doped with aluminum, structural stability according to the crystal structure of the lithium cobalt-based oxide is improved even in a high-temperature and a high-voltage environment, and thus, lifespan and resistance characteristics are improved. In one or more embodiments, titanium substitutes in part of the cobalt sites in the positive active material, and surface resistance of the positive active material is further improved.

A positive active material according to one or more embodiments has a R-3m rhombohedral layered structure, and has a specific surface area of 0.1 m²/g to 3 m²/g.

A positive active material containing 6,000 ppm or more of aluminum may further include magnesium. Here, a content (e.g., amount) of magnesium may be 500 ppm to 2,000 ppm. When a positive active material according to one or more embodiments further includes magnesium, high-voltage characteristics and high-temperature characteristics may be enhanced.

When a positive active material according to one or more embodiments includes magnesium, the positive active material may be, for example, a compound represented by Formula 3.

$$Li_{a-b-c}Al_bMg_cCo_{1-x-y-z}Al_xTi_yM2_zO_2,$$   Formula 3 wherein in Formula 3, $0.9 \leq a \leq 1.1$, $0 \leq b \leq 0.01$, $0 < c \leq 0.01$, $0.02 \leq x \leq 1$, $0 < y \leq 0.01$, and $0 \leq z \leq 0.01$, and
M2 includes (e.g., is at least one element selected from) Al, B, Ca, Sr, Ba, V, Cr, Fe, Cu, W, Mo, Zr, Ta, and/or Nb.
In Formula 3, x may be, for example, $0.02 \leq x \leq 0.033$, $0.02 \leq x \leq 0.029$, or $0.02 \leq x \leq 0.025$, y may be, for example, $0.001 \leq y \leq 0.005$, $0.001 \leq y \leq 0.003$, or $0.001 \leq y \leq 0.002$.
In Formula 3, c may be, for example, $0.001 \leq c \leq 0.01$, $0.001 \leq c \leq 0.008$, or $0.003 \leq c \leq 0.007$.

A positive electrode and a lithium secondary battery including the positive active material are provided. A lithium secondary battery according to one or more embodiments shows an excellent or suitable trickle charge stability. Here, the trickle charge stability refers to time required until a current rapidly increases when a substantially continuous charging is performed.

A positive active material according to one or more embodiments may be prepared by obtaining a mixture by mixing lithium cobalt-based oxide containing 6,000 ppm or more of aluminum, a cobalt precursor, a lithium precursor, and a titanium precursor; and by heat-treating the mixture.

The cobalt precursor may be, for example, cobalt oxide, and the titanium precursor may include (e.g., may be, for example, at least one selected from) titanium hydroxide, titanium chloride, titanium sulfate and/or titanium dioxide.

The heat-treatment may be performed at 800° C. to 1,000° C. When a heat-treatment is performed within the above-described range, a positive active material having an good or suitable particle strength and high-voltage and high-temperature characteristics may be prepared.

A size of the cobalt precursor may be 1 μm to 10 μm.

The lithium cobalt-based oxide may be, for example, a mixture of large particles and small particles. Hereinafter, a method of preparing a positive active material by utilizing such a mixture will be described.

First, a first mixture is obtained by mixing a cobalt precursor having a size of about 1 μm to 10 μm, an aluminum precursor and a lithium precursor.

For example, a mixture of precursors may be obtained by mixing while a mixing ratio of the lithium precursor, the cobalt precursor, and the aluminum precursor is stoichiometrically controlled or selected in order to obtain the desired or suitable lithium cobalt composite oxide.

A magnesium precursor may be further included in the first mixture as needed or desired.

As the lithium precursor, at least one of (e.g., one selected from) lithium hydroxide (LiOH), lithium carbonate (LiCO$_3$), lithium chloride, lithium sulfate (Li$_2$SO$_4$), and/or lithium nitrate may be utilized.

As the cobalt precursor, at least one of (e.g., one selected from) cobalt carbonate, cobalt oxide, cobalt chloride, cobalt sulfate, and/or cobalt nitrate may be utilized. Moreover, as the aluminum precursor, at least one of (e.g., one selected from) aluminum sulfate, aluminum chloride, and/or aluminum hydroxide may be utilized, and as the magnesium precursor, at least one of (e.g., one selected from) magnesium sulfate, magnesium chloride, and/or magnesium hydroxide may be utilized.

For the mixing, a dry mixing such as a mechanical mixing may be performed by utilizing a ball mill, a Banbury mixer, a homogenizer, or a Hensel mixer. A dry mixing may reduce preparing costs compared to a wet mixing.

The size of the cobalt precursor may be, as described above, 1 μm to 10 μm, or for example, 4 μm to 7 μm. When the size of the cobalt precursor is less than 1 μm, particle growth may be slow, and when the size of the cobalt precursor is more than 10 μm, obtaining the desired or suitable large-particle lithium cobalt composite oxide becomes difficult.

Subsequently, by performing a primary heat-treatment on the first mixture in the air or under an oxygen atmosphere, large-particle lithium cobalt composite oxide, which is a product of the primary heat-treatment, may be obtained.

A particle size of the large-particle lithium cobalt composite oxide, which is a product of the primary heat-treatment, may be 10 μm to 20 μm, for example, 14 μm to 20 μm, or for example, 17 μm.

Separately, a second mixture is obtained by mixing a cobalt precursor having a size of 2 μm to 3 μm, an aluminum precursor, and a lithium precursor, and a primary heat-treatment is performed on the second mixture to prepare small-particle lithium cobalt composite oxide.

A size of the small-particle lithium cobalt composite oxide may be 2 μm to 8 μm, for example, 3 μm to 4 μm.

When a size of the cobalt precursor utilized in preparing small-particle lithium cobalt composite oxide is less than 2 μm or greater than 3 μm, it is difficult to obtain the small-particle lithium cobalt composite oxide having a desired or suitable size.

When preparing the above-described large-particle lithium cobalt composite oxide and small-particle lithium cobalt composite oxide, a mixing ratio (lithium/metal) of lithium to metal (where metal includes the metals in the first mixture and second mixture, respectively, except lithium) may be 1.01 to 1.05, or for example, 1.02 to 1.04. Furthermore, in preparing the large-particle lithium cobalt composite oxide and the small-particle lithium cobalt composite oxide, a heating rate may be 4° C./min to 8° C./min. When the heating rate is within this range, cation mixing may be prevented or reduced. When the heating rate is 4° C./min, phase stability improvement at high voltages is negligible.

A third mixture is obtained by mixing the large-particle lithium cobalt composite oxide and the small-particle lithium cobalt composite oxide at a weight ratio of 7:3 to 1:9, and by adding a cobalt precursor, a lithium compound, and a titanium precursor, and a secondary heat-treatment is performed on the third mixture. The second heat-treatment may be performed at 800° C. to 1,000° C., or for example, 900° C. A heating rate when the secondary heat-treatment is performed may be 4° C./min to 6° C./min.

As the cobalt precursor, for example, cobalt oxide may be utilized. A size of the cobalt precursor may be 1 μm to 10 μm.

An example of the titanium precursor may be, titanium dioxide, titanium hydroxide, titanium chloride, titanium sulfate, or a combination thereof.

A molar ratio (Li/Metal) of lithium and the metal in the precursor mixture before performing the secondary heat-treatment is controlled or selected to be 0.99 to 1. When a molar ratio of lithium and the metal is in the above-described range, a lithium cobalt composite oxide with improved high-voltage phase stability may be prepared.

The above-described secondary heat-treatment may be performed in the air or under an oxygen atmosphere at 400° C. to 1,200° C., or for example 900° C. to 1,100° C. Here, the oxygen atmosphere may be formed by utilizing oxygen alone, or by utilizing oxygen and inert gases, such as nitrogen, together. The heat-treatment time is variable according to the heat-treatment temperature. The heat-treatment may be performed, for example, for 5 hours to 20 hours.

A particle strength of a positive active material according to one or more embodiments may be 200 mN or more. Particle strength may be measured by utilizing a particle strength analyzer, and refers to a yield point measured when pressing the particle which is to be measured in a vertical direction.

A positive active material according to one or more embodiments includes particles existing separately, and crush strength of the particles may be 400 MPa or more, 445 MPa or more, or 445 MPa to 45,000 MPa. When crush strength is in these ranges, particles have almost no volume change when charging and discharging are repeated, and particle cracks are rarely generated in a pressing process for molding a positive electrode. Further, a positive active material having a high particle strength may be provided when crush strength is in these ranges.

In addition to the solid-state reaction method described above, a positive active material according to one or more embodiments may be prepared utilizing a method such as a spray pyrolysis method.

According to one or more embodiments, a lithium secondary battery including a positive electrode including the above-described lithium cobalt composite oxide is provided. A method of preparing the lithium secondary battery is as follows.

A positive electrode is prepared according to the following method.

A positive active material composition, in which a positive active material according to one or more embodiments, a binder, and a solvent are mixed, is prepared. A conductor may be further included in the positive active material composition. A positive electrode plate is prepared by directly coating the positive active material composition on a metal current collector and drying it. In one or more embodiments, the positive active material composition may be cast on a separate support, and then a film peeled off from the support may be laminated on the metal current collector to prepare a positive electrode plate. A first positive active material which is a positive active material generally utilized in a lithium secondary battery may be further included in preparing the positive electrode. At least one of (e.g., one selected from) lithium cobalt oxide, lithium nickel cobalt manganese oxide, lithium nickel cobalt aluminum oxide, lithium iron phosphate, and/or lithium manganese oxide may be further included as the first positive active material, but the first positive active material is not limited thereto, and any material(s) that may be utilized as a positive active material in the art may be utilized. For example, a compound represented by any one of the following formulae may be utilized: $Li_aA_{1-b}B_bD_2$ (wherein, $0.90 \leq a \leq 1.8$, and $0 \leq b \leq 0.5$); $Li_aE_{1-b}B_bO_{2-c}D_c$ (wherein, $0.90 \leq a \leq 1.8$, $0 \leq b \leq 0.5$, and $0 \leq c \leq 0.05$); $LiE_{2-b}B_bO_{4-c}D_c$ (wherein, $0 \leq b \leq 0.5$, and $0 \leq c \leq 0.05$); $Li_aNi_{1-b-c}Co_bB_cD_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F'_\alpha$ (wherein, $0.900 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F'_\alpha$ (wherein, $0.900 \leq a \leq 1.8$, $0 \leq b \leq 0.5$, $0 \leq c \leq 0.05$, and $0 < \alpha < 2$); $Li_aN-i_bE_cG_dO_2$ (wherein, $0.900 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein, $0.900 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1.8$, and $0.001 \leq b \leq 0.1$); $Li_aCoG_bO_2$ (wherein, $0.90 \leq a \leq 1.8$, and $0.001 \leq b \leq 0.1$); $Li_aMnG_bO_2$ (wherein, $0.90 \leq a \leq 1.8$, and $0.001 \leq b \leq 0.1$); $Li_aMn_2GbO_4$ ((wherein, $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($LiNiVO_4$; $Li_{(3-f)}J_2$ ($0 \leq f \leq 2$); $Li_{(3-f)}Fe_2(PO_4)_3$($LiNiVO_4$; $Li_{(3-f)}J_2$ ($0 \leq f \leq 2$); and $LiFePO_4$. In the formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

A binder in the positive active material composition may include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxy propylcellulose, regenerated Cellulose, polyvinylpyrrolidone, tetrafluoroethylene, polyethylene, polypropylene, ethylene-propylene-diene monomer (EPDM), sulfonated-EPDM, styrene butadiene rubber (SBR), fluororubber, polyamideimide, polyacrylic acid (PAA), polyvinylidene fluoride, lithium polyacrylate, lithium polymethacrylate, ethylene-propylene-diene monomer (EPDM), and/or one or more suitable copolymers.

The conductor is not particularly limited within the range of suitable conductors as long as the conductor does not cause a chemical change in the battery and has conductivity (e.g., is a conductor) and, for example, graphite such as natural graphite or artificial graphite; carbon-based materials such as carbon black, acetylene black, ketjen black, channel black, furnace black, lamp black, and summer black; conductive fibers such as carbon nanotubes, carbon fibers, and metal fibers; carbon fluoride; metal powders such as aluminum powder and nickel powder; conductive whiskers such as zinc oxide and potassium titanate; conductive metal oxides such as titanium dioxide; and/or conductive materials such as a polyphenylene derivative may be utilized.

A content (e.g., amount) of 1 part by weight to 10 parts by weight, or 1 part by weight to 5 parts by weight of the conductor may be utilized. When a content (e.g., amount) of the conductor is in these ranges, the ultimately obtained electrode has excellent or suitable conductivity characteristics.

As a non-limiting example of the solvent, N-methyl pyrrolidone and/or the like may be utilized, and a content (e.g., amount) of the solvent utilized may be 20 parts by weight to 200 parts by weight with respect to 100 parts by weight of the positive active material. When a content (e.g., amount) of the solvent is in this range, the process of forming a positive active material layer is easily or readily performed.

A thickness of the positive electrode current collector is 3 μm to 500 μm, and the positive electrode current collector is not particularly limited within the range of suitable positive electrode current collectors as long as the positive electrode current collector does not cause a chemical change in the battery and has conductivity (e.g., is a conductor) and, for example, stainless steel, aluminum, nickel, titanium, heat-treated carbon, and/or aluminum or stainless steel surface-treated with carbon, nickel, titanium, silver, etc. may be utilized. A current collector may increase adhesion of the positive active material by forming fine irregularities on its surface, and one or more suitable forms such as a film, a sheet, a foil, a net, a porous body, a foam, and a nonwoven fabric are possible.

In contrast, it is also possible to form pores inside the electrode by further adding a plasticizer to the positive active material composition and/or the negative active material composition.

Contents (e.g., amounts) of the positive active material, the conductor, the binder, and the solvent are levels commonly utilized in lithium secondary batteries. Depending on the use and configuration of the lithium secondary battery, one or more of the conductive material, binder, and/or solvent may not be provided.

A negative electrode may be obtained by utilizing an almost identical method, except that a negative active material is utilized instead of a positive active material in the above-described process for preparing a positive electrode.

As a negative active material, a carbon-based material, silicon, silicon oxide, a silicon-based alloy, a silicon carbon-based material complex, tin, a tin-based alloy, metal oxide, or a combination thereof, may be utilized.

The carbon-based material may be crystalline carbon, amorphous carbon or a mixture thereof. The crystalline carbon may be graphite such as amorphous, plate-like, flake-like, spherical or fibrous natural graphite, or artificial graphite, and the amorphous carbon may be soft carbon (carbon calcined at a low temperature) or hard carbon, mesophase pitch carbonization product, calcined cokes, graphene, carbon black, carbon nanotube, and/or carbon fiber, but is not necessarily limited to thereto and any suitable material that may be utilized in the art may be utilized.

For the negative active material, at least one of (e.g., one selected from) Si, $SiO_x$ ($0 < x < 2$, for example, x may be 0.5 to 1.5), Sn, $SnO_2$, a silicon-containing metal alloy, and/or a mixture thereof may be utilized. For the metal capable of forming the silicon alloy, at least one of (e.g., one selected from) Al, Sn, Ag, Fe, Bi, Mg, Zn, in, Ge, Pb, and/or Ti may be utilized.

The negative active material may include metals/metalloids that may be alloyed with lithium, an alloy thereof, or an oxide thereof. For example, the metal/metalloid that may be alloyed with lithium may be Si, Sn, Al, Ge, Pb, Bi, Sb, Si—Y alloy (wherein Y is an alkali metal, an alkaline earth metal, a group 13 element, a group 14 element, a transition metal, a rare earth element, or a combination thereof, and not Si), Sn—Y alloy (wherein Y is an alkali metal, an alkaline earth metal, a group 13 element, a group 14 element, a transition metal, a rare earth element, or a combination thereof, and not Sn), $MnO_x$ ($0 < x \leq 2$), and/or the like. The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. For example, the oxide of the metal/metalloid that may be alloyed with the lithium may be lithium titanium dioxide, vanadium oxide, lithium vanadium oxide, $SnO_2$, $SiO_x$ ($0<x<2$), etc.

The negative active material may include, for example, at least one of (e.g., one selected from) group 13 elements, group 14 elements, and/or group 15 elements in the periodic table of elements, specifically, at least one of (e.g., one selected from) Si, Ge, and/or Sn.

In a negative active material composition, a non-water-soluble binder, a water-soluble binder, or a combination thereof may be utilized as a binder.

The non-water-soluble binder includes ethylene propylene copolymer, polyacrylonitrile, polystyrene, polyvinyl chloride, carboxylated polyvinyl chloride, polyvinyl fluoride, polyurethane, polytetrafluoroethylene, polyvinylidene, fluoride, polyethylene, polypropylene, polyamideimide, polyimide, or a combination thereof.

As the water-soluble binder, styrene-butadiene rubber (SBR), acrylated styrene-butadiene rubber (ABR), acrylonitrile-butadiene rubber, acrylic rubber, butyl rubber, fluororubber, ethylene oxide-containing polymer, polyvinylpyrrolidone, polyepichlorohydrin, polyphosphazene, ethylene propylene diene copolymer, polyvinylpyridine, chlorosulfonated polyethylene, latex, polyester resin, acrylic resin, phenol resin, epoxy resin, polyvinyl alcohol, or a combination thereof may be utilized.

When a water-soluble binder is utilized as the negative electrode binder, a cellulose-based compound capable of giving viscosity may be further included as a thickener. As the cellulose-based compound, at least one of (e.g., one selected from) carboxymethyl cellulose, hydroxypropylmethyl cellulose, methyl cellulose, or an alkali metal salt thereof, may be mixed to be utilized. As the alkali metal, Na, K, and/or Li may be utilized. A content (e.g., amount) of the thickener may be 0.1 part by weight to 3 parts by weight with respect to 100 parts by weight of the negative active material.

As the conductor, carbon materials such as natural graphite, artificial graphite, carbon black, acetylene black, ketjen black, and/or carbon fiber; metal-based materials such as metal powder of copper, nickel, aluminum, silver, and/or a metal fiber; conductive polymers such as a polyphenylene derivative; or a mixture thereof may be utilized.

In the negative active material composition, the solvent may be the same as that utilized in the positive active material composition. And a content (e.g., amount) of the solvent is a level commonly utilized in lithium secondary batteries.

A separator is interposed between the positive electrode and the negative electrode, and an insulating thin film having high ionic transmittance and mechanical strength is utilized.

A diameter of the pore of the separator is generally 0.01 µm to 10 µm, and a thickness of the separator is generally 5 µm to 20 µm. As such a separator, for example, an olefin polymer such as polypropylene; sheets and nonwoven fabrics made of glass fibers or polyethylene are utilized. When a solid polymer electrolyte is utilized as an electrolyte, the solid polymer electrolyte may also be a separator.

As an example of an olefin polymer in the separator, polyethylene, polypropylene, polyvinylidene fluoride, or a multilayer film of two or more layers thereof may be utilized, and a mixed multilayer film such as a polyethylene/polypropylene two-layer separator, a polyethylene/polypropylene/polyethylene three-layer separator, a polypropylene/polyethylene/polypropylene three-layer separator and/or the like may be utilized.

The non-aqueous electrolyte containing a lithium salt is composed of a non-aqueous electrolyte and a lithium salt.

As the non-aqueous electrolyte, a non-aqueous electrolyte, an organic solid electrolyte, or an inorganic solid electrolyte is utilized.

The non-aqueous electrolyte solution includes an organic solvent. For the organic solvent, any suitable organic solvent that may be utilized as an organic solvent in the art may be utilized. The organic solvent may be, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

As the organic solid electrolyte, for example, polyethylene derivatives, polyethylene oxide derivatives, polypropylene oxide derivatives, phosphoric acid ester polymers, polyvinyl alcohol, and/or the like may be utilized.

As the inorganic solid electrolyte, for example, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and/or the like may be utilized.

The lithium salt is a material that dissolves well in the non-aqueous electrolyte, and is for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x, y are natural numbers), $LiCl$, $LiI$, or a mixture thereof. In one or more embodiments, in order to improve charge/discharge characteristics, flame retardancy, etc., for example, pyridine, triethylphosphite, triethanolamine, cyclic ether, ethylene diamine, n-glyme, hexamethyl phosphoramide, nitrobenzene derivatives, sulfur, quinone imine dyes, N-substituted oxazolidinone, N, N-substituted imidazolidine, ethylene glycol dialkyl ether, ammonium salts, pyrrole, 2-methoxyethanol, aluminum trichloride, etc. may be added. In some cases, halogen-containing solvents such as carbon tetrachloride, ethylene trifluoride, etc. may be further included to help provide incombustibility. A preferred concentration of a lithium salt is in the range of 0.1 M to 2.0 M. When a concentration of a lithium salt is included in this range, the electrolyte has an appropriate or suitable conductivity and viscosity, and an excellent or suitable electrolyte performance may be exhibited, and lithium ions may move effectively.

The lithium secondary battery includes a positive electrode, a negative electrode, and a separator. As such a separator, polyethylene, polypropylene, polyvinylidene fluoride, or a multilayer film of two or more layers thereof may be utilized, and a mixed multilayer film such as a polyethylene/polypropylene two-layer separator, a polyethylene/polypropylene/polyethylene three-layer separator, a polypropylene/polyethylene/polypropylene three-layer separator and/or the like may be utilized.

The positive electrode, the negative electrode, and the separator are wound or folded to be enclosed in a battery case. Next, an organic electrolyte solution is injected into the battery case, then the battery case is sealed with a cap assembly, and a lithium battery is completed. The battery case may have a cylindrical shape, a rectangular shape, or a thin film shape.

A separator may be arranged between the positive electrode and the negative electrode to form a battery structure. When the battery structure is laminated in a bi-cellular structure, impregnated with an organic electrolyte, and accommodated in a pouch and sealed, a lithium ion polymer battery is completed.

In one or more embodiments, a plurality of the battery structures may be laminated to form a battery pack, and such a battery pack may be utilized for all devices that require high capacity and high power. For example, the battery pack may be utilized in a laptop, a smartphone, an electric vehicle, etc.

A lithium secondary battery according to one or more embodiments which is given as an example is a cylindrical shape, but the present disclosure is not limited thereto and one or more suitable shapes such as a rectangular shape, a pouch shape, or a coin shape may be utilized.

Figure 5:
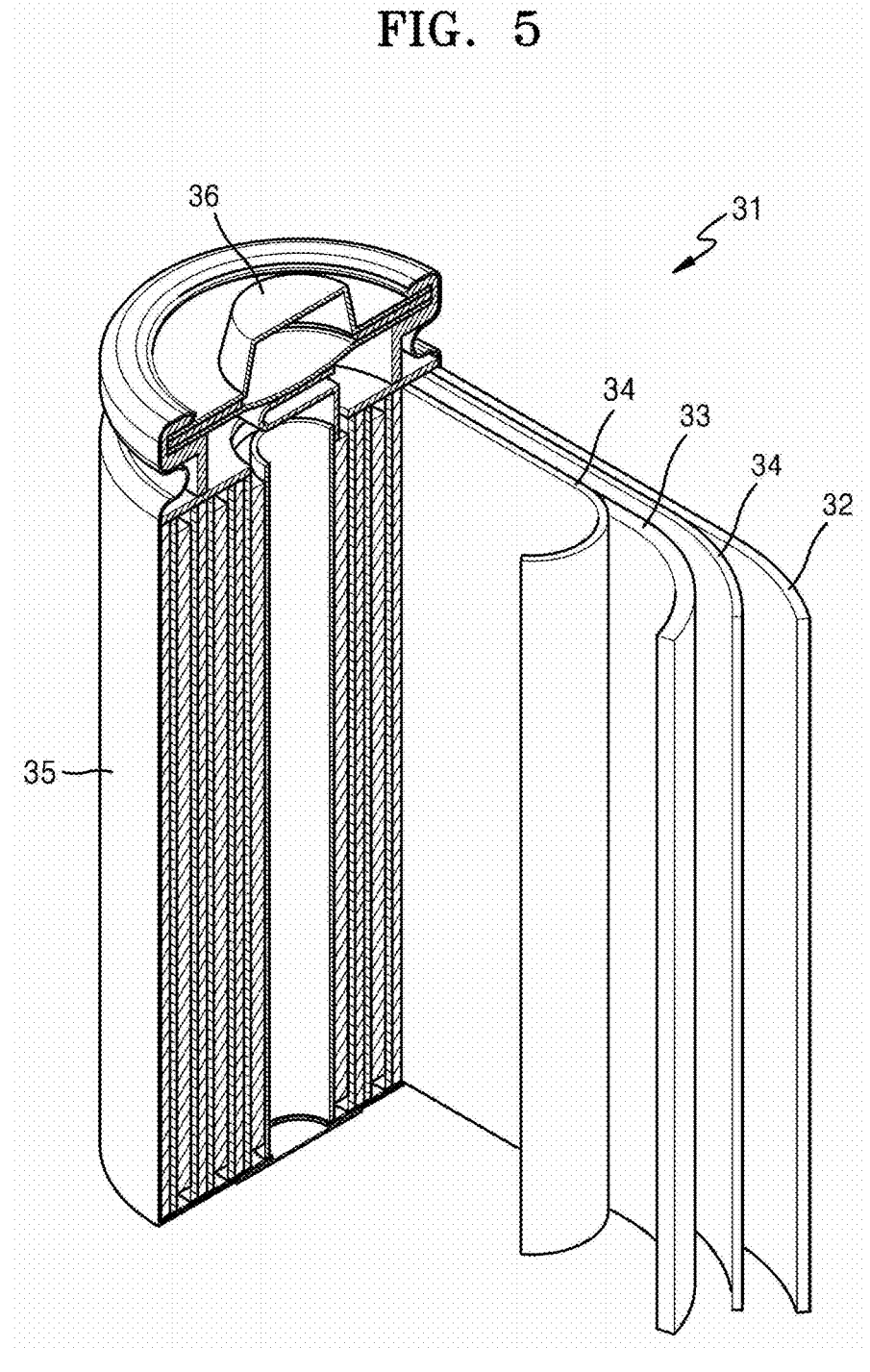
FIG. 5 is a schematic diagram illustrating a partial cross-section of a lithium secondary battery according to one or more embodiments of the present disclosure.

FIG. 5 is a schematic diagram illustrating a partial cross-section of a lithium secondary battery according to one or more embodiments of the present disclosure.

Figure 3:
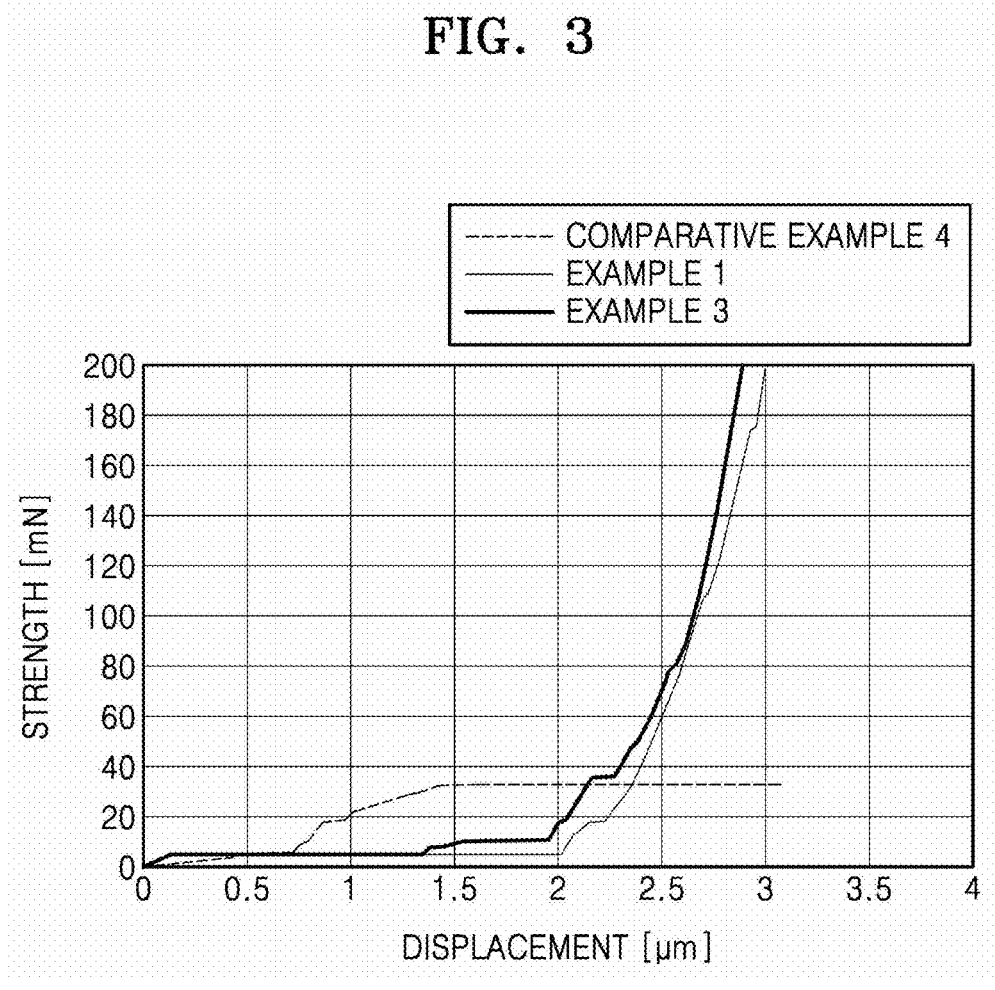
FIG. 3 is a graph showing displacement versus force, which is particle strength measurement data for positive active materials prepared according to Example 1, Example 3, and Comparative Example 4.

Referring to FIG. 3, a lithium secondary battery 31 includes a positive electrode 32, a negative electrode 33, and a separator 34. The above-described positive electrode 33, negative electrode 32, and separator 34 are wound or folded to be enclosed in the battery case 35. A separator is interposed between the positive electrode and the negative electrode according to the shape of the battery and an alternately laminated battery structure may be formed. Next, an organic electrolyte solution is injected into the battery case 35, then the battery case 35 is sealed with a cap assembly 86, and a lithium secondary battery 31 is completed. The battery case 35 may have a cylindrical shape, a rectangular shape, or a thin film shape. For example, the lithium secondary battery 31 may be a large thin-film battery. The lithium secondary battery may be a lithium-ion battery. When the battery structure is enclosed in a pouch, impregnated with an organic electrolyte solution and sealed, a lithium ion polymer battery is completed. In one or more embodiments, a plurality of the battery structures may be laminated to form a battery pack, and such a battery pack may be utilized for all devices that require high capacity and high power. For example, the battery pack may be utilized in a laptop, a smartphone, an electric vehicle, etc.

The present disclosure will be described in more detail through the following examples and comparative examples. However, the examples are intended to illustrate the present disclosure, and the scope of the present disclosure is not limited thereto.

Preparation of Positive Active Material

Example 1: LCO Doped with 6,000 ppm of Al+Ti Surface Coating [Nanoparticles $Co(OH)_2$ Coating]

A first mixture was obtained by mixing lithium carbonate, $Co_3O_4$ (D50: 4.5 μm), and aluminum hydroxide $Al(OH)_3$. Contents of the lithium carbonate, $Co_3O_4$ (D50: 4.5 μm), and aluminum hydroxide $Al(OH)_3$ in the first mixture were stoichiometrically controlled or selected to obtain $Li_{1.04}Co_{0.978}Al_{0.022}O_2$.

The first mixture was heated at a heating rate of 6° C./min to 1088° C., a primary heat-treatment was performed on the first mixture at this temperature for 15 hours under an air atmosphere, and large particles ($Li_{1.04}Co_{0.978}Al_{0.022}O_2$) having a layered structure and an average particle diameter (D50) of about 17 μm were prepared.

Separately, a second mixture was obtained by mixing $Co_3O_4$ (D50: 2.5 μm), which is a cobalt precursor, aluminum hydroxide $Al(OH)_3$, and lithium carbonate. Contents of the $Co_3O_4$ (D50: 2.5 μm), aluminum hydroxide $Al(OH)_3$, and lithium carbonate in the second mixture were stoichiometrically controlled or selected to obtain $Li_{1.01}Co_{0.978}Al_{0.022}O_2$.

The second mixture was heated at a heating rate of 4.5° C./min to 940° C., a primary heat-treatment was performed on the second mixture at this temperature for 5 hours, and small particles ($Li_{1.01}Co_{0.978}Al_{0.022}O_2$) having a layered structure and an average particle diameter (D50) of about 3.5 μm were obtained.

After mixing the large particles and the small particles obtained in the process at a weight ratio of 8:2, titanium dioxide and cobalt hydroxide ($Co(OH)_2$) were added, and a third mixture was obtained. A secondary heat-treatment was performed on the third mixture at about 900° C., and a bimodal positive active material was obtained.

The bimodal positive active material contains large particles $Li_{1.04}Co_{0.978}Al_{0.022}O_2$ (D50: 17 μm) having a $Li_4Ti_5O_{12}$ coating layer formed on the surface, and small particles $Li_{1.01}Co_{0.978}Al_{0.022}O_2$ (D50: 3.5 μm) having a $Li_4Ti_5O_{12}$ coating layer formed on the surface.

Example 2: LCO Doped with 1,000 ppm of Mg and 6,000 ppm of Al+Ti Surface Coating [Nanoparticles $Co(OH)_2$ Coating]

A first mixture was obtained by mixing lithium carbonate, $Co_3O_4$ (D50: 4.5 μm), aluminum hydroxide $Al(OH)_3$ and magnesium oxide, which is a magnesium precursor. Contents of the lithium carbonate, $Co_3O_4$ (D50: 4.5 μm), aluminum hydroxide $Al(OH)_3$, and magnesium hydroxide in the first mixture were stoichiometrically controlled or selected to obtain large particles ($Li_{1.04}Mg_{0.004}Co_{0.978}Al_{0.022}O_2$).

The first mixture was heated at a heating rate of 6° C./min to 1088° C., a primary heat-treatment was performed on the first mixture at this temperature for 15 hours under an air atmosphere, and large particles ($Li_{1.04}Mg_{0.004}Co_{0.978}Al_{0.022}O_2$) having a layered structure and an average particle diameter (D50) of about 17 μm were prepared.

Separately, a second mixture was obtained by mixing $Co_3O_4$ (D50: 2.5 μm), which is a cobalt precursor, aluminum hydroxide $Al(OH)_3$, and lithium carbonate. Contents of the $Co_3O_4$, aluminum hydroxide, and lithium carbonate in the second mixture were stoichiometrically controlled or selected to obtain $Li_{1.02}Mg_{0.004}Co_{0.978}Al_{0.022}O_2$.

The second mixture was heated at a heating rate of 4.5° C./min to 940° C., a heat-treatment was performed at this temperature for 5 hours, and small particles ($Li_{1.02}Mg_{0.004}Co_{0.978}Al_{0.022}O_2$) having a layered structure and an average particle diameter (D50) of about 3.5 μm were obtained.

After mixing the large particles and the small particles obtained in the process at a weight ratio of 8:2, titanium dioxide and cobalt hydroxide ($Co(OH)_2$) were added, and a third mixture was obtained. A secondary heat-treatment was performed on the third mixture at about 900° C., and a bimodal positive active material containing large particles $Li_{1.04}Mg_{0.004}Co_{0.978}Al_{0.022}O_2$ (D50: 17 μm) having a $Li_4Ti_5O_{12}$ coating layer formed on the surface, and small particles $Li_{1.02}Mg_{0.004}Co_{0.978}Al_{0.022}O_2$ (D50: 3.5 μm) having a $Li_4Ti_5O_{12}$ coating layer formed on the surface was obtained.

Example 3: LCO Doped with 7,000 ppm of Al+Ti Surface Coating [Nanoparticles $Co(OH)_2$ Coating]

A first mixture was obtained by mixing lithium carbonate, $Co_3O_4$ (D50: 4.5 μm), and aluminum hydroxide $Al(OH)_3$. Contents of the lithium carbonate, $Co_3O_4$ (D50: 4.5 μm), and aluminum hydroxide $Al(OH)_3$ in the first mixture were stoichiometrically controlled or selected to obtain $Li_{1.04}Co_{0.975}Al_{0.025}O_2$.

The first mixture was heated at a heating rate of 6° C./min to 1088° C., a primary heat-treatment was performed on the first mixture at this temperature for 15 hours under an air atmosphere, and large particles ($Li_{1.04}Co_{0.975}Al_{0.025}O_2$) having a layered structure and an average particle diameter (D50) of about 17 μm were prepared.

Separately, a second mixture was obtained by mixing $Co_3O_4$ (D50: 2.5 μm), which is a cobalt precursor, aluminum hydroxide $Al(OH)_3$, and lithium carbonate. Contents of the $Co_3O_4$, aluminum hydroxide, and lithium carbonate in the second mixture were stoichiometrically controlled or selected to obtain $Li_{1.02}Co_{0.975}Al_{0.025}O_2$.

The second mixture was heated at a heating rate of 4.5° C./min to 940° C., a heat-treatment was performed on the second mixture at this temperature for 5 hours, and small particles ($Li_{1.02}Co_{0.975}Al_{0.025}O_2$) having a layered structure and an average particle diameter (D50) of about 3.5 μm were obtained.

After mixing the large particles and the small particles obtained in the process at a weight ratio of 8:2, titanium dioxide and cobalt hydroxide ($Co(OH)_2$) were added, and a third mixture was obtained. A secondary heat-treatment was performed on the third mixture at about 900° C., and a bimodal positive active material containing large particles $Li_{1.04}Co_{0.975}Al_{0.025}O_2$ (D50: 17 μm) having a $Li_4Ti_5O_{12}$ coating layer formed on the surface, and small particles $Li_{1.02}Co_{0.975}Al_{0.025}O_2$ (D50: 3.5 μm) having a $Li_4Ti_5O_{12}$ coating layer formed on the surface was obtained.

Examples 4 to 6

A positive active material was prepared in substantially the same manner as in Example 1, except that weight ratios of the large particles and the small particles in Example 4, Example 5, and Example 6 were 2:8, 1:9, and 9:1 instead of 8:2, respectively.

Comparative Example 1: LCO Doped with 1,000 ppm of Mg [Nanoparticles $Co(OH)_2$ Coating]

A large-particle and small-particle positive active material was prepared in substantially the same manner as in Example 2, except that aluminum hydroxide is not utilized when preparing the first mixture and the second mixture.

After mixing the large particles and the small particles obtained in the process at a weight ratio of 8:2, cobalt hydroxide ($Co(OH)_2$) was added, and a third mixture was obtained. A secondary heat-treatment was performed on the third mixture at about 900° C., and a bimodal positive active material containing large particles (D50: 17 μm) and small particles (D50: 3.5 μm) was obtained.

A $LiCoO_2$ coating layer was formed on the surface of the positive active material. The overall composition of the positive active material having a coating layer formed on the surface is $Li_{1.00}Mg_{0.005}CoO_2$.

Comparative Example 2: LCO Doped with 4,000 ppm of Al [Nanoparticles $Co(OH)_2$ Coating]

A large-particle and small-particle positive active material was prepared in substantially the same manner as in Example 1, except that contents of the lithium carbonate, $Co_3O_4$, and aluminum hydroxide $Al(OH)_3$ were stoichiometrically controlled or selected to obtain $Li_{1.04}Co_{0.985}Al_{0.015}O_2$ in preparing the first mixture and the second mixture.

After mixing the large particles and the small particles obtained in the process at a weight ratio of 8:2, cobalt hydroxide ($Co(OH)_2$) was added, and a third mixture was obtained. A secondary heat-treatment was performed on the third mixture at about 900° C., and a bimodal positive active material containing large particles of $Li_{1.04}Co_{0.985}Al_{0.015}O_2$ (D50: 17 μm) and small particles of $Li_{1.04}Co_{0.985}Al_{0.015}O_2$ (D50: 3.5 μm) was obtained.

A $LiCoO_2$ coating layer was formed on the surface of the positive active material. The overall composition of the positive active material having a coating layer formed on the surface is $Li_{1.00}Co_{0.985}Al_{0.015}O_2$.

Comparative Example 3: LCO Doped with 1,000 ppm of Mg and 4,000 ppm of Al[Nanoparticles $Co(OH)_2$ Coating]

A large-particle and small-particle positive active material were prepared in substantially the same manner as in Example 2, except that lithium carbonate, $Co_3O_4$, aluminum hydroxide $Al(OH)_3$, and magnesium hydroxide were utilized in preparing the first mixture and the second mixture, and a mixing ratio of each of precursors was stoichiometrically controlled or selected so that $Li_{1.04}Mg_{0.005}Co_{0.985}Al_{0.015}O_2$ may be obtained.

After mixing the large particles and the small particles obtained in the process at a weight ratio of 8:2, cobalt hydroxide ($Co(OH)_2$) was added, and a third mixture was obtained. A secondary heat-treatment was performed on the third mixture at about 900° C., and a bimodal positive active material containing the large particles of $Li_{1.04}Mg_{0.005}Co_{0.985}Al_{0.015}O_2$ (D50: 17 μm) and the small particles of $Li_{1.04}Mg_{0.005}Co_{0.985}Al_{0.015}O_2$ (D50: 3.5 μm) was obtained.

The positive active material has a $LiCo_2O_4$ coating layer formed on the surface and the overall composition of the composite positive active material is $Li_{1.00}Mg_{0.005}Co_{0.985}Al_{0.015}O_2$.

Comparative Example 4: LCO Doped with 1,000 ppm of Mg and 4,000 ppm of Al+700 ppm of Ti Surface Coating [Nanoparticles $Co(OH)_2$ Coating A large-particle and small-particle positive active material was prepared in substantially the same manner as in Example 2, except that lithium carbonate, $Co_3O_4$, aluminum hydroxide $Al(OH)_3$, and magnesium hydroxide were utilized in preparing the first mixture and the second mixture, and a mixing ratio of each of precursors was stoichiometrically controlled or selected so that $Li_{1.04}Mg_{0.005}Co_{0.985}Al_{0.015}O_2$ may be obtained.

After mixing the large particles and the small particles obtained in the process at a weight ratio of 8:2, titanium dioxide and cobalt hydroxide ($Co(OH)_2$) were added, and a third mixture was obtained. A content (e.g., amount) of titanium dioxide was controlled or selected so that a content (e.g., amount) of titanium may be 700 ppm in the positive active material.

A secondary heat-treatment was performed on the third mixture at about 900° C., and a bimodal positive active material containing the large particles of $Li_{1.04}Mg_{0.005}Co_{0.985}Al_{0.015}O_2$ (D50: 17 μm) and the small particles of $Li_{1.04}Mg_{0.005}Co_{0.985}Al_{0.015}O_2$ (D50: 3.5 μm) was obtained.

The positive active material has a $Li_4Ti_5O_{12}$ coating layer formed on the surface and the overall composition of the composite positive active material is $Li_{1.00}Mg_{0.005}Co_{0.983}Al_{0.015}Ti_{0.002}O_2$.

Comparative Example 5: LCO Doped with 0 ppm of Mg and 4,000 ppm of Al+700 Ppm of Ti Surface Coating [Nanoparticles Co(OH)₂ Coating A positive active material was prepared in substantially the same manner as in Comparative Example 4, except that except that magnesium hydroxide was not utilized in preparing the first mixture and the second mixture.

Comparative Example 6: LCO Doped with 1,000 ppm of Mg and 4,000 ppm of Al+1,000 ppm of Ti Surface Coating [Nanoparticles Co(OH)₂ Coating A positive active material was prepared in substantially the same manner as in Comparative Example 4, except that a content (e.g., amount) of titanium dioxide was changed in preparing the third mixture so that a content (e.g., amount) of titanium in the positive active material may be 1,000 ppm.

Comparative Example 7: LCO Doped with 1,000 ppm of Al+Ti Surface Coating [Co₃O₄ Coating A positive active material was obtained in substantially the same manner as in Example 1, except that cobalt oxide $(Co_3O_4)$ was utilized instead of cobalt hydroxide in preparing the third mixture.

Preparation of Lithium Secondary Battery

Manufacturing Example 1

Air bubbles were removed from a mixture of a positive active material obtained according to Example 1, polyvinylidene fluoride, and carbon black, which is a conductor, by utilizing a mixer, and a uniformly dispersed slurry for forming a positive active material layer was prepared. A solvent of N-methyl 2-pyrrolidone was added to the mixture, and a mixing ratio of the positive active material, the polyvinylidene fluoride, and the carbon black was a weight ratio of 98:1:1. The slurry prepared according to the process was coated on a thin film of aluminum by utilizing a doctor's blade to make a thin electrode plate, and the plate was dried for not less not 3 hours at 135° C., and then a positive electrode was prepared through rolling and vacuum drying processes.

For the negative electrode, a composition for forming a negative active material was obtained by mixing natural graphite, carboxymethylcellulose (CMC), and styrene butadiene rubber (SBR), and the composition was coated on a copper current collector and dried to prepare a negative electrode. A weight ratio of the natural graphite, CMC, and SBR was 97.5:1:1.5, and a content (e.g., amount) of distilled water was about 50 parts by weight with respect to 100 parts by weight of the total weight of the natural graphite, CMC, and SBR.

A separator (thickness: about 10 μm) consisting of a porous polyethylene (PE) film was interposed between the positive electrode and the negative electrode, and an electrolyte solution was injected to prepare a lithium secondary battery. For the electrolyte solution, a solvent in which ethylene carbonate (EC), ethyl methyl carbonate (EMC), and dimethyl carbonate (DMC) were mixed at a volume ratio of 3:4:3, and 1.1 M of dissolved $LiPF_6$ was included, was utilized.

Manufacturing Example 2 to 3

Lithium secondary batteries were prepared in substantially the same manner as in Manufacturing Example 1, except that each of positive active materials of Examples 2 to 3 was utilized instead of the positive active material of Example 1 when preparing a positive electrode.

Comparative Manufacturing Example 1 to 7

A lithium secondary battery was prepared in substantially the same manner as in Manufacturing Example 1, except that each of positive active materials of Comparative Examples 1 to 7 was utilized instead of the positive active material of Example 1 when preparing a positive electrode.

Evaluation Example 1: Scanning Electron Microscope

A scanning electron microscope analysis was performed on the positive active material prepared according to Example 1. Results of the scanning electron microscope analysis are as shown in FIG. 1.

Referring to FIG. 1, the positive active material of Example 1 was found to have a lithium titanium-based compound on the surface in a form of an island coating layer (e.g., a coating layer in which the lithium titanium-based compound is formed in separate island-like structures).

Evaluation Example 2: Scanning Electron Microscope

A scanning electron microscope analysis was performed on the positive active materials prepared according to Example 1 and Example 2. Results of the scanning electron microscope analysis are as shown in FIG. 2A and FIG. 2B.

Figure 2A:
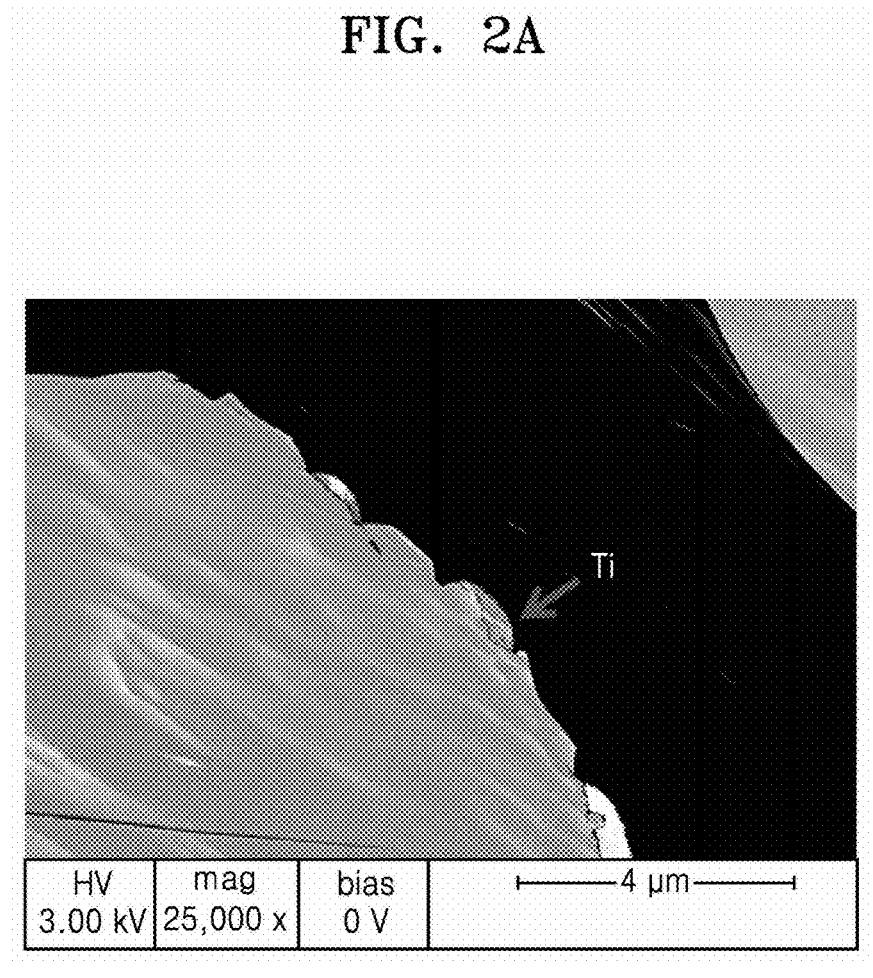
FIG. 2A is a scanning electron microscope image of a cross-section of the positive active material of Example 1.
Figure 2B:
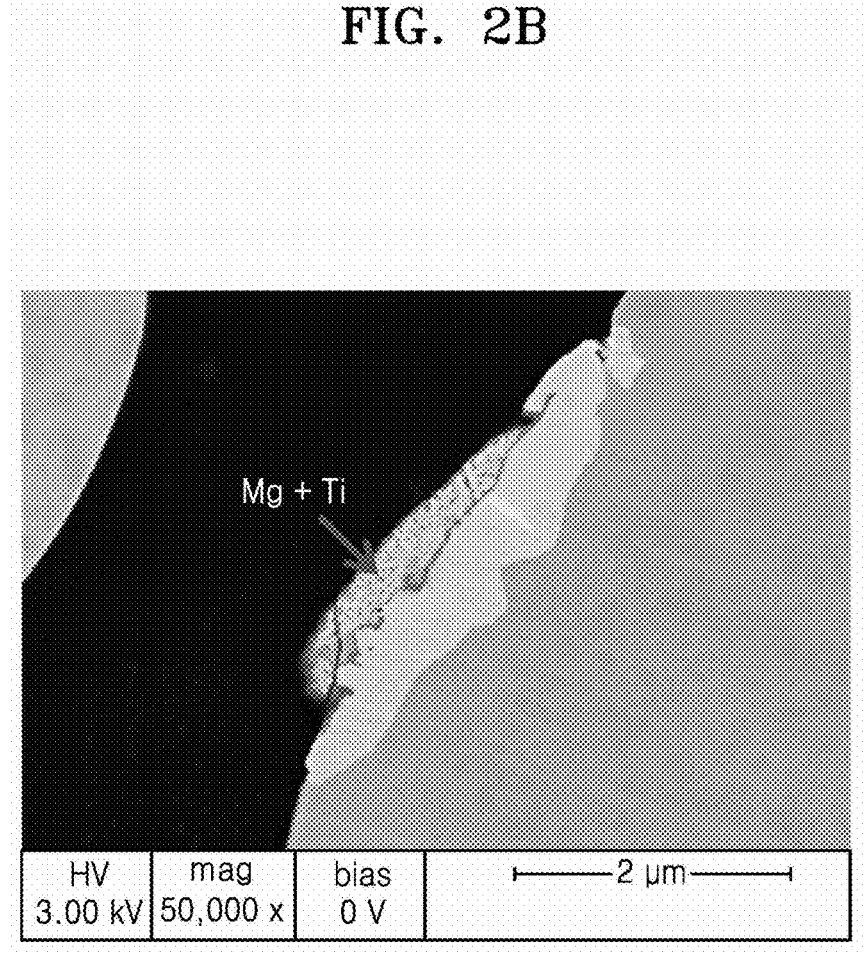
FIG. 2B is a scanning electron microscope image of a cross-section of the positive active material of Example 2.

Referring to FIG. 2A, the positive active material of Example 1 has a cross sectional structure doped with Al without Mg and coated with Ti. Referring to FIG. 2B, positive active material of Example 2 has a cross sectional structure doped with Mg and Al and coated with Ti.

Evaluation Example 3: Charge/Discharge Characteristics

A lithium secondary battery was charged at a constant current of 0.5 C at 25° C. until a state of charge (SOC) of 90% was reached, aging proceeded for 48 hours, and in a constant current/constant voltage mode, while maintaining a voltage of 4.58 V, the battery was cut off at a current of 0.05 C rate. Subsequently, the batteries were discharged at a constant current of 0.5 C rate until the voltage reached 3.0 V (formation process).

The lithium secondary batteries that went through the formation process were charged at a constant current of 0.2 C until the voltage reached 4.55 V. After the charging is completed in the batteries, there was a rest period of about 10 minutes, and the batteries were discharged at a constant current of 0.2 C until the voltage reached 3 V.

Initial charge/discharge efficiency was evaluated according to Equation 1 and the evaluation results are shown in Table 1.

Initial charge/discharge efficiency (%)=(discharge
capacity (0.2 C) at the first cycle/charge capac-
ity (0.2 C) at the first cycle)×100          Equation 1

Evaluation Example 4: High-Temperature Lifespan

The lithium secondary batteries prepared in Manufacturing Examples 1 to 3 and Comparative Manufacturing Examples 1 to 7 were charged at a constant current of 0.5 C at 45° C. until a state of charge (SOC) of 90% is reached, aging proceeded for 48 hours, and in a constant current/constant voltage mode, while maintaining a voltage of 4.58 V, the battery was cut off at a current of 0.05 C rate. Subsequently, the battery was discharged at a constant current of 0.5 C rate until the voltage reached 3.0 V (formation process, 1st cycle).

The lithium secondary battery that went through the 1st cycle of the formation process was charged at 45° C. at a constant current of 0.2 C until the voltage reached 4.55 V. After the charging is completed in the battery, there was a rest period of about 10 minutes, and then the battery was discharged at a constant current of 0.2 C until the voltage reached 3 V; and the cycle was repeatedly performed for 50 times for evaluation.

High-temperature lifespans were evaluated according to Equation 2 and the evaluation results are shown in Table 1.

Lifespan (%)=(discharge capacity at the 40th cycle/
discharge capacity at the first cycle)×100          Equation 2

Figure 4:
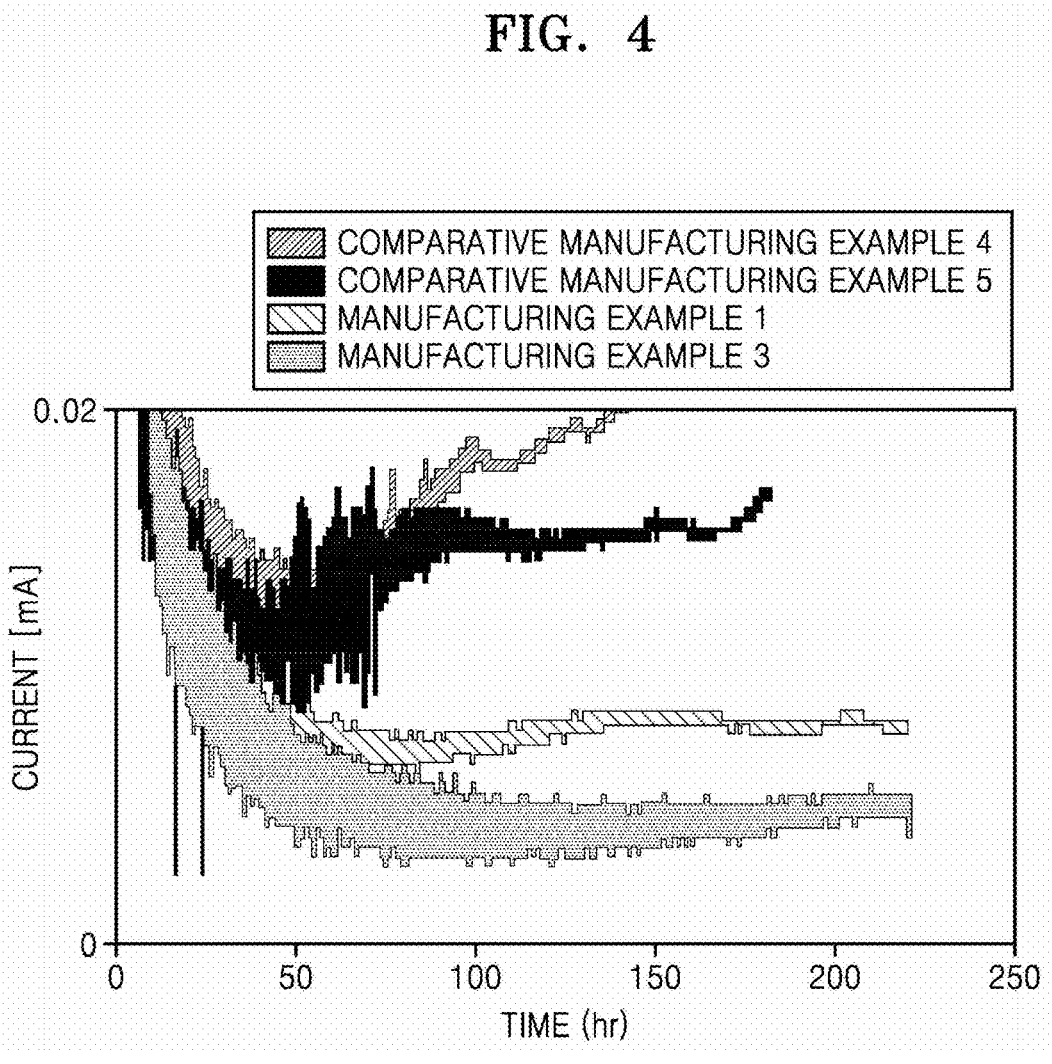
FIG. 4 is a graph showing high-temperature substantially continuous charging characteristics of lithium secondary batteries of Manufacturing Example 1, Manufacturing Example 3, Comparative Manufacturing Example 4, and Comparative Manufacturing Example 5.

C., and the results are shown in FIG. 4. Charging time of the 4.35 V high-temperature continuous charging was measured and shown in Table 2.

High-temperature continuous charging time is measured in an experiment for finding out high-temperature stability, and is time at which a current rapidly increases during continuous charging. A more detailed description is as follows.

Continuous charging is a test evaluating in a continuous charging mode. In general, even when a charging is continued, the current commonly becomes a number close to zero in a constant numerical range due to self-discharge. However, in an abnormal state of side reactions, etc., the current being charged is consumed and a supplied current increases on the graph. For example, a lifespan evaluation tests how well the battery endures stress of compression and expansion of the electrode plate and phase transition when charging and discharging are repeated, whereas high-temperature continuous charging tests how long the battery is stable under a high-temperature charging condition.

TABLE 2

| Class | High-temperature continuous charging time (Hr) |
|---|---|
| Manufacturing Example 1 | 200 or more |
| Manufacturing Example 3 | 200 or more |

TABLE 1

| Coin cell | Manufac-turing Example 1 | Manufac-turing Example 2 | Manufac-turing Example 3 | Comparative Manufac-turing Example 1 | Comparative Manufac-turing Example 2 | Comparative Manufac-turing Example 3 | Comparative Manufac-turing Example 4 | Comparative Manufac-turing Example 5 | Comparative Manufac-turing Example 6 | Comparative Manufac-turing Example 7 |
|---|---|---|---|---|---|---|---|---|---|---|
| 0.2 C charge capacity (mAh) | 208.1 | 208.7 | 207.8 | 212.2 | 210.1 | 209.4 | 209.5 | 210.2 | 209.6 | 209.6 |
| 0.2 C discharge capacity (mAh) | 192.5 | 194.1 | 191.4 | 206.3 | 197.9 | 195.8 | 195.7 | 197.1 | 196.0 | 191.8 |
| 0.2 C charge/ discharge efficiency (%) | 92.5 | 93.0 | 92.1 | 97.2 | 94.2 | 93.5 | 93.4 | 93.8 | 93.5 | 91.5 |
| High temterature lifespan (%) (@50cycle) | 62.3 | 70.2 | 69.4 | 32.0 | 48.5 | 52.6 | 47.5 | 49.6 | 49.0 | 49.2 |

As shown in Table 1, lithium secondary batteries of Manufacturing Examples 1 to 3 have improved high-temperature lifespan characteristics compared to Comparative Manufacturing Examples 1 to 7. Lithium secondary batteries of Comparative Manufacturing Examples 1 to 7 showed good or suitable charge/discharge efficiencies but had significantly deteriorated high-temperature lifespan characteristics compared to Manufacturing Examples 1 to 3.

Evaluation Example 4: High-Temperature Continuous Charging

Lithium secondary batteries prepared according to Manufacturing Example 1, Manufacturing Example 3, Comparative Manufacturing Example 4 and Comparative Manufacturing Example 5 were continuously charged while maintaining a voltage of 4.35V at a high temperature of 60°

TABLE 2-continued

| Class | High-temperature continuous charging time (Hr) |
|---|---|
| Comparative Manufacturing Example 4 | 70 |
| Comparative Manufacturing Example 5 | 60 |

As shown in FIG. 4 and Table 2, the lithium secondary batteries of Manufacturing Examples 1 and 3 were maintained stably even after a long (e.g., substantial) period of continuous charging, and found to have a much enhanced high-temperature characteristics compared to lithium secondary batteries of Comparative Manufacturing Examples 4 and 5.

Evaluation Example 6: Particle Strength and Crush Strength

In order to measure particle strengths of positive active materials prepared according to Example 1, Example 3, and Comparative Example 4, a particle strength tester (micro compression tester: Shimadzu's MCT-211) was utilized, and a displacement-strength graph is shown in FIG. 3.

Particle strengths are evaluated by measuring yield points in which cracks occur in a particle by applying pressure while constantly increasing displacement of the positive active materials prepared according to Examples 1 and 3, and Comparative Example 4.

Firstly, a displacement value of a particle was measured by applying a test pressure (load) to one randomly selected particle by utilizing a micro compression tester (MCT-510) manufactured by Shimadzu Manufacturing, Inc. When the test pressure is gradually raised, the test strength (P) is the pressure level at which the displacement becomes maximized while the test pressure remains substantially constant. This is used to calculate a crush strength (St) according to an equation made by Hiramatsu et al., represented by Equation 3, (Japanese mining, Vol. 81, (1965)).

A diameter (d) in Equation 3 was obtained by observing the particle utilized in the measurement by utilizing a microscope attached to the micro compression tester (MCT-510), and by calculating an average distance between parallel lines drawn in a certain direction with respect to the particle and having the particle in-between and a distance between parallel lines perpendicular to the parallel lines having the particle in-between.

$$St = 2.8 \times P/(d \times d \times d) \qquad \text{Equation 3}$$

The positive active material according to Comparative Example 4 was crushed at about 32.6 mN and was shown to have a low strength, but positive active materials according to Examples 1 to 3 (see FIG. 3) showed improved particle strength characteristics and did not crush at 200 mN which is the limit of the measuring device, unlike the positive active material according to Comparative Example 4.

In Equation 3, particle strength (P) of Example 1 and Example 3 is 200 mN or more, and d is a diameter.

The results of the evaluation, crush strengths according to diameters of the positive active materials of Example 1 and Comparative Example 4, are shown in Table 3. In addition, in order to identify the lower limit of the particle strength, particles of different sizes among the particles of Example 1 were selected, and crush strength was measured, compared, and is shown in Table 3.

TABLE 3

| Class | Particle diameter of positive active material (μm) | Crush strength (MPa) |
|---|---|---|
| Example 1 and Example 3 | 17 | 616 |
| Comparative Example 4 | 17 | 108 |
| Sample of Example 1- 10 μm | 10 | 1782 |
| Sample of Example 1- 20 μm | 20 | 445 |

As shown in Table 3, positive active materials of Examples 1 and 3 showed improved crush strength compared to the positive active material of Comparative Example 4. A positive active material according to one or more embodiments has excellent or suitable particle strength and high-pressure and high-temperature characteristics. A high-energy density lithium secondary battery with improved high-temperature characteristics may be prepared by applying a positive electrode including such a positive active material.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. It will be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Further, the use of "may" when describing embodiments of the present disclosure refers to "one or more embodiments of the present disclosure."

The electrode, battery (e.g., battery management), electronic device or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that one or more suitable changes in form and details may be made therein without departing from the spirit and scope of the disclosure as defined by the following claims and equivalents thereof.

What is claimed is:

1. A positive active material for a lithium secondary battery, the positive active material comprising
a lithium cobalt-based oxide comprising about 6,000 ppm or more of aluminum, and
a lithium titanium-based compound, wherein the lithium titanium-based compound is on a surface of the lithium cobalt-based oxide in separate, island-like structures,
wherein the positive active material comprises a mixture of small particles and large particles, the large particles having an average size of about 10 µm to about 20 µm, and the small particles having an average size of about 2 µm to about 8 µm.

2. The positive active material of claim 1, wherein the lithium titanium-based compound is represented by Formula 1:

$$Li_{4-x}Mg_xTi_5M1_yO_{12}, \text{ and} \qquad \text{Formula 1}$$

wherein in Formula 1, $0 \leq x \leq 0.1$, and $0 \leq y \leq 0.1$, and M1 is at least one of Co, Al, B, Ca, Sr, Ba, V, Cr, Fe, Cu, W, Mo, Zr, Ta, or Nb.

3. The positive active material of claim 2, wherein the lithium titanium-based compound belongs to a space group of Fd-3m, and has a spinel structure.

4. The positive active material of claim 2, wherein in Formula 1, x is 0.

5. The positive active material of claim 1, wherein a particle size of the lithium titanium-based compound is about 0.2 µm to about 2 µm.

6. The positive active material of claim 1, wherein the amount of the aluminum in the lithium cobalt-based oxide is about 6,000 ppm to about 8,000 ppm.

7. The positive active material of claim 1, wherein the positive active material is represented by Formula 2 or Formula 3:

$$Li_{a-b}Al_bCo_{1-x-y-z}Al_xTi_yM2_zO_2, \text{ and} \qquad \text{Formula 2}$$

wherein in Formula 2, $0.9 \leq a \leq 1.1$, $0 \leq b \leq 0.1$, $0.02 \leq x \leq 1$, $0 < y \leq 0.01$, and $0 \leq z < 0.01$, and M2 is at least one of Al, B, Ca, Sr, Ba, V, Cr, Fe, Cu, W, Mo, Zr, Ta, or Nb, $$Li_{a-b-c}Al_bMg_cCo_{1-x-y-z}Al_xTi_yM2_zO_2, \text{ and} \qquad \text{Formula 3}$$

wherein in Formula 3, $0.9 \leq a \leq 1.1$, $0 \leq b \leq 0.01$, $0 < c \leq 0.01$, $0.02 \leq x \leq 1$, $0 < y \leq 0.01$, and $0 \leq z \leq 0.01$, and M2 is at least one of Al, B, Ca, Sr, Ba, V, Cr, Fe, Cu, W, Mo, Zr, Ta, or Nb.

8. The positive active material of claim 1, wherein a mixing weight ratio of the large particles to the small particles is 7:3 to 9:1.

9. The positive active material of claim 1, wherein a particle strength of the positive active material is 200 mN or more.

10. The positive active material of claim 1, wherein a crush strength of the positive active material is 400 MPa or more.

11. A method of preparing the positive active material of claim 1, the method comprising:
obtaining a mixture by mixing the lithium cobalt-based oxide containing 6,000 ppm or more of aluminum, a cobalt precursor, and a titanium precursor; and
heat-treating the mixture.

12. The method of preparing the positive active material of claim 11, wherein
the cobalt precursor is cobalt oxide or cobalt hydroxide, and
the titanium precursor is at least one of titanium hydroxide, titanium chloride, titanium sulfate, or titanium dioxide.

13. The method of preparing the positive active material of claim 11, wherein the heat-treatment is performed at about 800° C. to about 1,000° C.

14. The method of preparing the positive active material of claim 11, wherein a size of the cobalt precursor is about 1 µm to about 10 µm.

15. A lithium secondary battery comprising:
a positive electrode comprising the positive active material of claim 1;
a negative electrode; and
an electrolyte between the positive electrode and the negative electrode.

16. The lithium secondary battery of claim 15, wherein the positive active material consists essentially of the lithium cobalt-based oxide comprising about 6,000 ppm or more of the aluminum and the lithium titanium-based compound, wherein the lithium titanium-based compound is on the surface of the lithium cobalt-based oxide.

17. The lithium secondary battery of claim 15, wherein the positive active material consists of the lithium cobalt-based oxide comprising about 6,000 ppm or more of the aluminum and the lithium titanium-based compound, wherein the lithium titanium-based compound is on the surface of the lithium cobalt-based oxide.

18. The lithium secondary battery of claim 15, wherein the lithium titanium-based compound on the surface of the positive active material is represented by Formula 1:

$$Li_{4-x}Mg_xTi_5M1_yO_{12}, \text{ and} \qquad \text{Formula 1}$$

wherein in Formula 1, $0 \leq x \leq 0.1$, and $0 \leq y \leq 0.1$, and M1 is at least one of Co, Al, B, Ca, Sr, Ba, V, Cr, Fe, Cu, W, Mo, Zr, Ta, or Nb.

19. The lithium secondary battery of claim 15, wherein the positive active material is represented by Formula 2 or Formula 3:

$$Li_{a-b}Al_bCo_{1-x-y-z}Al_xTi_yM2_zO_2, \text{ and} \qquad \text{Formula 2}$$

wherein in Formula 2, $0.9 \leq a \leq 1.1$, $0 \leq b \leq 0.1$, $0.02 \leq x \leq 1$, $0 < y \leq 0.01$, and $0 \leq z < 0.01$, and M2 is at least one of Al, B, Ca, Sr, Ba, V, Cr, Fe, Cu, W, Mo, Zr, Ta, or Nb, $$\text{Li}_{a-b-c}\text{Al}_b\text{Mg}_c\text{Co}_{1-x-y-z}\text{Al}_x\text{Ti}_y\text{M2}_z\text{O2, and} \qquad \text{Formula 3}$$

wherein in Formula 3, $0.9 \leq a \leq 1.1$, $0 \leq b \leq 0.01$, $0 < c \leq 0.01$, $0.02 \leq x \leq 1$, $0 < y \leq 0.01$, and $0 \leq z \leq 0.01$, and M2 is at least one of Al, B, Ca, Sr, Ba, V, Cr, Fe, Cu, W, Mo, Zr, Ta, or Nb.

\* \* \* \* \*